(12) United States Patent
Kim et al.

(10) Patent No.: US 8,284,371 B2
(45) Date of Patent: Oct. 9, 2012

(54) LIQUID CRYSTAL DISPLAY PANEL AND FABRICATING METHOD WITH SPACER RESTRICTED TO A CENTRAL HOLE AMONG TWO OR MORE HOLES

(75) Inventors: Jeong Hyun Kim, Gunpo-si (KR); Myoung Ho Lee, Anyang-si (KR); Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 751 days.

(21) Appl. No.: 11/449,619

(22) Filed: Jun. 9, 2006

(65) Prior Publication Data

US 2006/0285062 A1    Dec. 21, 2006

(30) Foreign Application Priority Data

Jun. 15, 2005 (KR) .................. 10-2005-0051654

(51) Int. Cl.
*G02F 1/1333* (2006.01)
*G02F 1/1339* (2006.01)

(52) U.S. Cl. ........................ 349/155; 349/110

(58) Field of Classification Search .............. 349/141, 349/155–157
See application file for complete search history.

(56) References Cited

U.S. PATENT DOCUMENTS

| | | | |
|---|---|---|---|
| 2001/0040663 A1* | 11/2001 | Jun ................................ | 349/141 |
| 2004/0114090 A1* | 6/2004 | Washizawa et al. ........... | 349/158 |
| 2005/0007525 A1* | 1/2005 | Jun et al. ....................... | 349/110 |
| 2005/0270471 A1* | 12/2005 | Kitagawa et al. .............. | 349/156 |

* cited by examiner

*Primary Examiner* — Jessica M Merlin
(74) *Attorney, Agent, or Firm* — McKenna Long & Aldridge, LLP

(57) ABSTRACT

This invention relates to a liquid crystal display panel adapted to minimize movement of a spacer, and a fabricating method thereof. A liquid crystal display panel according to an embodiment of the invention includes a black matrix formed on a first substrate and formed in a boundary between pixel areas for dividing the pixel areas; red, green, and blue color filters formed at the divided pixel areas; at least two holes adjacent to each other on the black matrix; at least one dam dividing the adjacent holes; and a spacer restricted within at least one of the at least two holes.

9 Claims, 11 Drawing Sheets

LIQUID CRYSTAL DISPLAY PANEL AND FABRICATING METHOD WITH SPACER RESTRICTED TO A CENTRAL HOLE AMONG TWO OR MORE HOLES

This application claims the benefit of Korean Patent Application No. 10-2005-0051654, filed on Jun. 15, 2005, which is hereby incorporated by reference for all purposes as if fully set forth herein.

BACKGROUND OF THE INVENTION

1. Field of the Invention

The present invention relates to a liquid crystal display panel and a fabricating method thereof. More particularly, the present invention relates to a liquid crystal display panel adapted to minimize movement of a spacer, and a fabricating method thereof.

2. Description of the Related Art

Generally, a liquid crystal display (LCD) device controls the light transmittance of liquid crystal material by using an electric field to thereby display a picture. The LCD device includes an LCD panel where liquid crystal cells are arranged in a matrix. The LCD device also includes a drive circuit used to drive the LCD panel.

The LCD panel includes pixel electrodes and a reference electrode, i.e., a common electrode, for applying the electric field to each of the liquid crystal cells.

Each of the pixel electrodes is connected to a thin film transistor (TFT) which is used as a switching device. The pixel electrode and the common electrode drive a liquid crystal cell according to a data signal supplied through the TFT.

LCD devices may broadly be classified into devices having a twisted nematic (TN) mode and devices having an in-plane switch (IPS) mode, according to the direction of the electric field which drives liquid crystal. In a device having a TN mode, a vertical direction electric field is applied. In a device having an IPS mode, a horizontal direction electric field is applied.

Figure 1A:
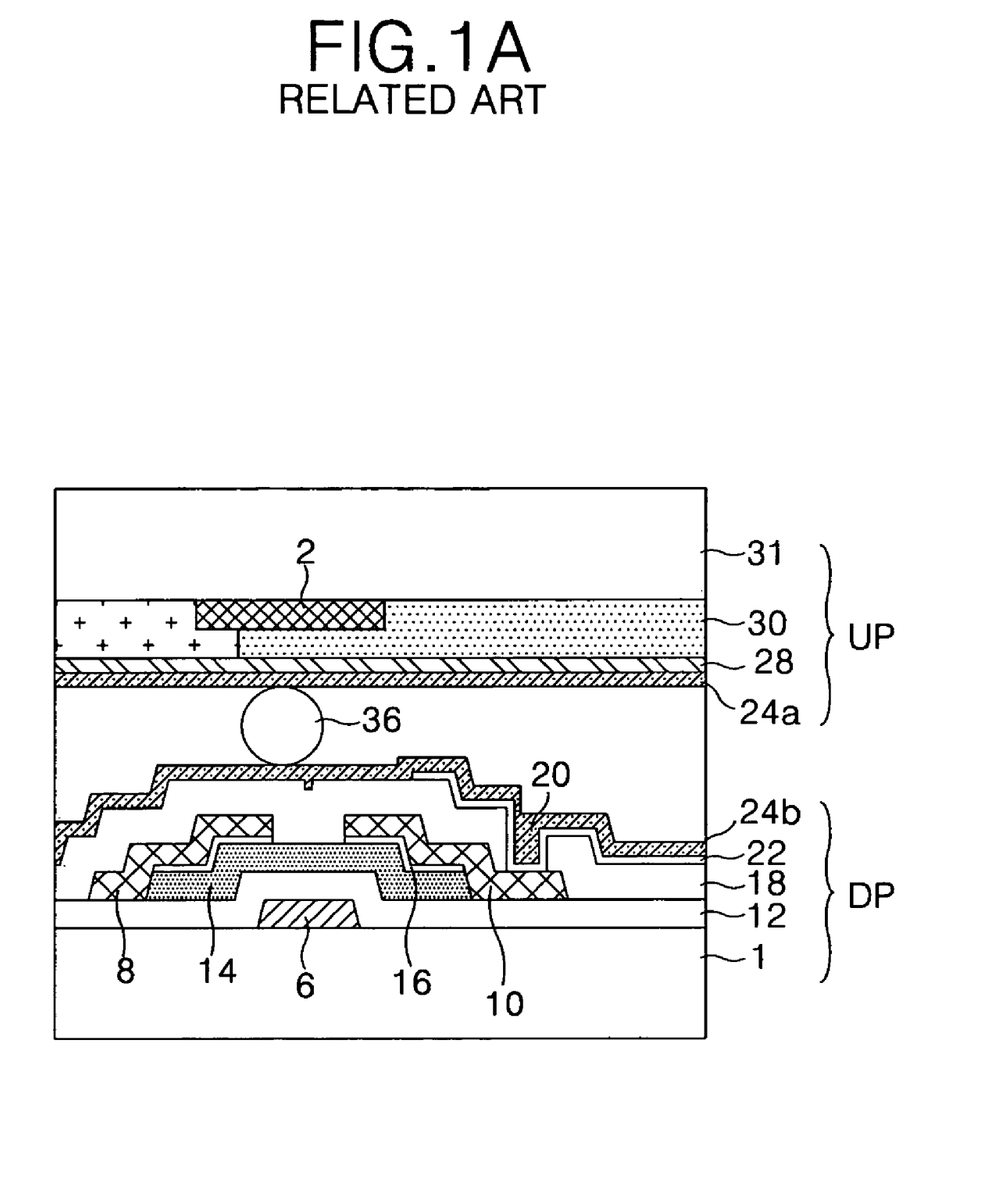
FIG. 1A is a cross sectional diagram representing a TN mode liquid crystal display panel of the related art.
Figure 1B:
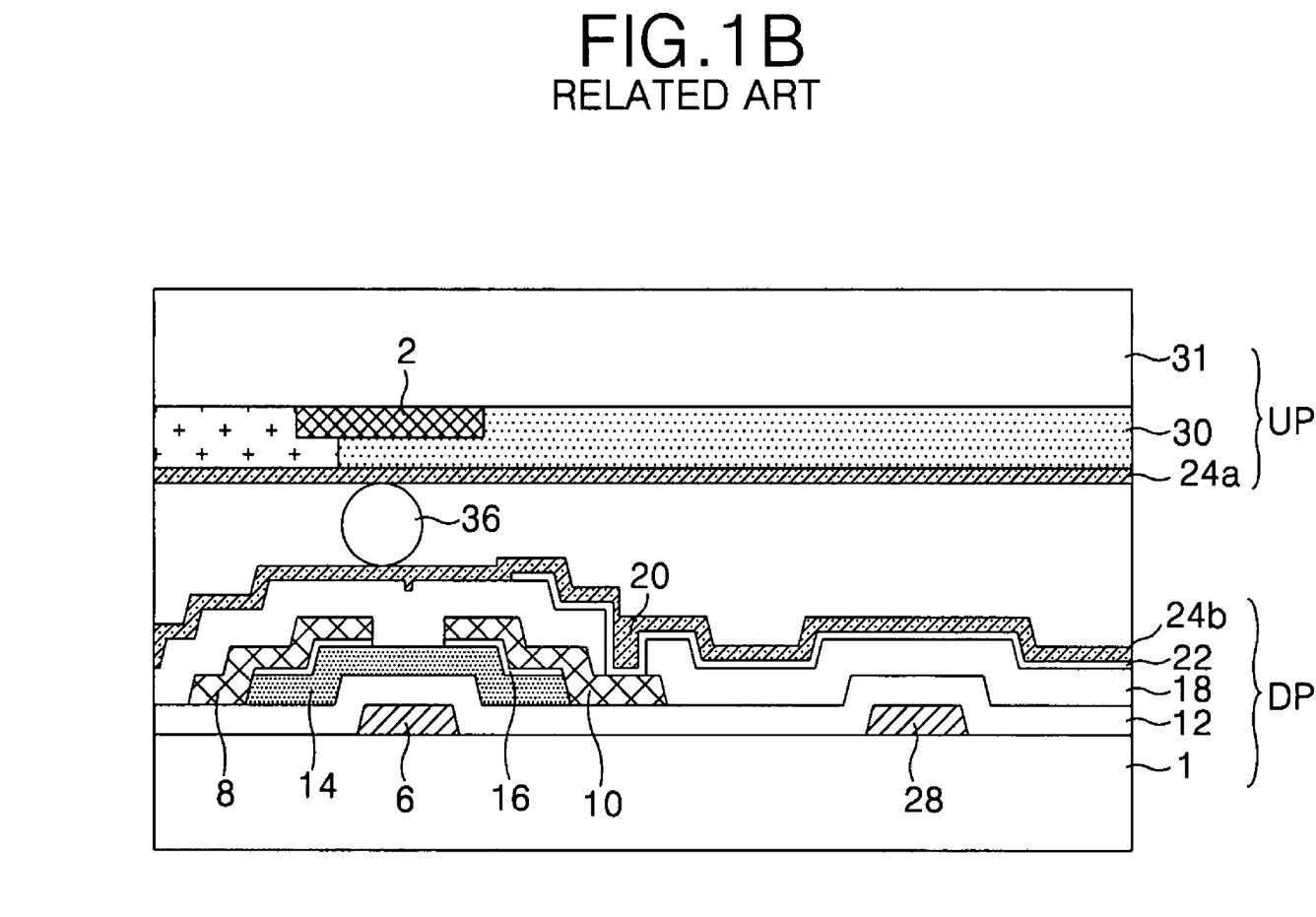
FIG. 1B is a cross sectional diagram representing an IPS mode liquid crystal display panel of the related art.

FIG. 1A is a diagram representing a TN mode LCD panel of the related art, and FIG. 1B is a diagram representing an IPS mode LCD panel of the related art.

Referring to FIGS. 1A and 1B, the TN mode LCD panel of the related art and the IPS mode LCD panel of the related art include an upper plate UP and a lower plate DP bonded to face each other with a ball spacer 36 therebetween.

Referring to FIG. 1A, the TN mode LCD panel of the related art includes an upper plate UP that includes a black matrix 2, a color filter 30, a common electrode 28 and an upper alignment film 24a sequentially formed on an upper substrate 31, and a lower plate DP that includes a TFT, a pixel electrode 22 and a lower alignment film 24b formed on a lower substrate 1.

In the TN mode LCD panel, the common electrode 28 is formed on the upper substrate 31 to enable the formation of a vertical electric field with the pixel electrode 22 which is formed on the lower substrate 1.

Referring to FIG. 1B, the IPS mode LCD panel of the related art includes an upper plate UP that includes a black matrix 2, a color filter 30 and an upper alignment film 24a sequentially formed on an upper substrate 31, and a lower plate DP that includes a TFT, a pixel electrode 22, a common electrode 28 and a lower alignment film 24b formed on a lower substrate 1.

In the IPS mode LCD panel, the common electrode 28 is formed on the lower substrate 1 in a stripe shape to be alternated with the pixel electrode 22 in a display area divided by the data line (not shown) and the gate line (not shown), thereby enabling the formation of a horizontal electric field with the pixel electrode 22.

Referring to FIGS. 1A and 1B, the black matrix 2 of the TN mode LCD panel of the related art and the IPS mode LCD panel of the related art divides the surface of the upper substrate 31 into a plurality of cell areas where the color filters in color filter 30 are to be formed. The black matrix 2 also acts to prevent an optical interference between adjacent cells.

The color filter 30 only transmits light of a specific wavelength which corresponds to a specific wavelength from a light source (not shown). The specific wavelengths of light are realized in red, green and blue colors.

The upper alignment film 24a and the lower alignment film 24b align the liquid crystal that is injected between the upper plate UP and the lower plate DP.

The TFT shown in FIGS. 1A and 1B includes a gate electrode 6 connected to the gate line (not shown) for switching the drive of the liquid crystal cell, a source electrode 8 connected to the data line (not shown), and a drain electrode 10 connected to the pixel electrode 22 through a contact hole 20. The TFT further includes a gate insulating film 12 for insulating the gate electrode 6, the source electrode 8 and the drain electrode 10; a semiconductor layer made of layers 14, 16 for forming a channel between the source electrode 8 and the drain electrode 10 using a gate voltage supplied to the gate electrode 6. The TFT selectively supplies the data signal from the data line to the pixel electrode 22 in response to the gate signal from the gate line.

The pixel electrode 22 is located at the cell area divided by the data line and the gate line and is formed of a transparent conductive material that has a high light transmittance. The pixel electrode 22 is formed on a passivation film 18 that is spread on the entire surface of the lower substrate 1 and is electrically connected to the drain electrode 10 through the contact hole 20. The contact hole 20 is formed to penetrate the passivation film 18.

The ball spacer 36 is formed between the upper plate UP and the lower plate DP and acts to provide a space into which the liquid crystal material can be injected. The ball spacer 36 is formed by spraying on at least any one of the substrates 1, 31 of the upper plate UP and the lower plate DP.

Further, the ball spacer 36 of the related art may be a plurality of ball spacers. The plurality of ball spacers may be uniformly scattered for uniformly keeping a cell gap of the liquid crystal cell. However, it is difficult to uniformly scatter the plurality of ball spacers because of a limitation in the uniformity of the scattering method. When the plurality of ball spacers is scattered non-uniformly, the cell gap becomes non-uniform. This causes the problematic generation of a spot in a screen.

Further, if a pressure is applied to a display area of the LCD panel, the ball spacer 36 moves between the upper plate UP and the lower plate DP. This causes the generation of a ripple phenomenon, where an image displayed in the display area becomes dark in a wave shape.

A column spacer that is fixed at a specific location to be patterned, and a patterning method thereof, has been developed for solving the above problem. However, the column spacer is formed by a photolithography process so that not less than 95% of a spacer material is removed. Thus, the usage rate of the material is not good and its fabrication process is complicated.

In order to reduce the waste of the material and the number of processes in the fabrication process, there has been developed a method for forming a ball spacer by using an ink-jet spraying device. The ball spacer forming method using the ink-jet spraying device is a method which can control the location where the ball spacer is to be formed. Thus, the ink-jet spraying device is different from the ball spacer scattering method of the related art which has the limitation in the uniformity thereof.

Figure 2:
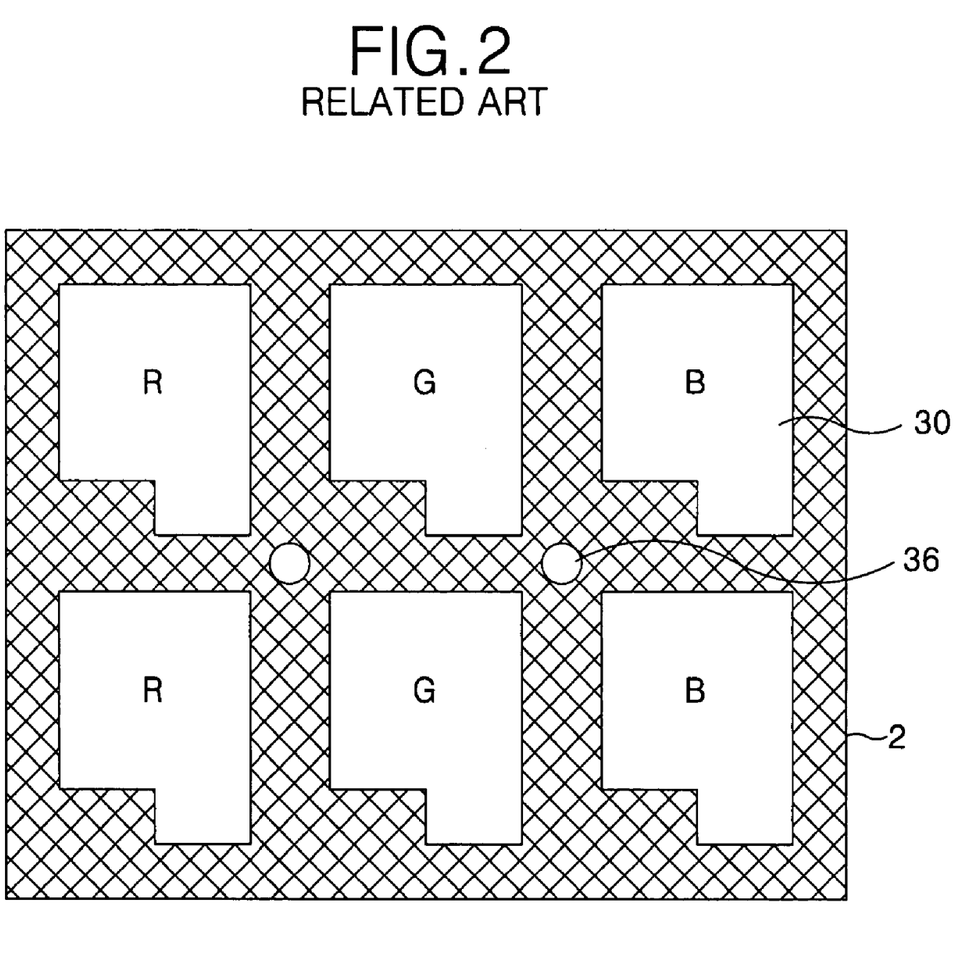
FIG. 2 is a diagram representing an example of a spacer arrangement of the liquid crystal display panel of the related art.
Figure 3:
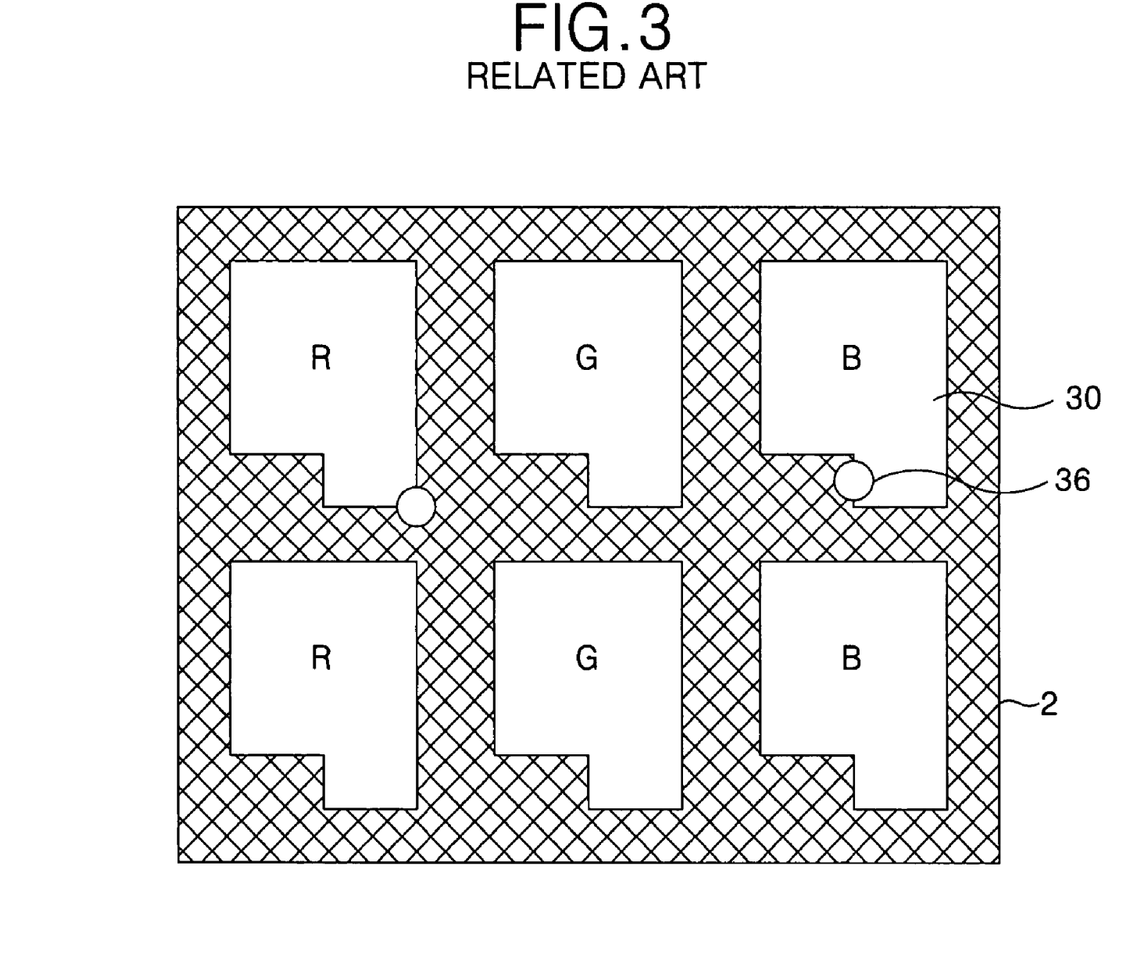
FIG. 3 is a diagram representing a phenomenon that a spacer shown in FIG. 2 moves after being disposed.

FIG. 2 is a diagram representing that a ball spacer 36 is disposed at a fixed point of a non-display area 2 by an ink-jet method. However, even though the ball spacer 36 is disposed at the fixed point of the desired location by the ink-jet method, the ball spacer 36 can be made to move by pressure, oscillation, impact, etc. which are applied in a process after the formation of the ball spacer 36. Accordingly, in the related art LCD panel, the ball spacer 36 moves to the display area of the color filter 30. FIG. 3 is a diagram representing a phenomenon that a ball spacer 36 shown in FIG. 2 moves after being disposed. This causes deterioration in a cell gap uniformity of the LCD panel and deterioration in a contrast ratio.

SUMMARY OF THE INVENTION

Accordingly, the present invention is directed to a liquid crystal display panel and fabricating method thereof that substantially obviate one or more of the problems due to limitations and disadvantages of the related art.

An advantage of the present invention is to provide a liquid crystal display panel adapted to minimize movement of a spacer, and a fabricating method thereof.

Additional features and advantages of the invention will be set forth in the description which follows, and in part will be apparent from the description, or may be learned by practice of the invention. These and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display panel includes a black matrix formed on a first substrate and formed in a boundary between pixel areas for dividing the pixel areas; red, green, and blue color filters formed at the divided pixel areas; at least two holes adjacent to each other on the black matrix; at least one dam dividing the adjacent holes; and a spacer restricted within at least one of the at least two holes.

In another aspect of the present invention, a fabricating method of a liquid crystal display panel includes providing a first substrate; forming a black matrix on the first substrate that divides pixel areas in a boundary between the pixel areas; forming red, green, and blue color filters in the divided pixel areas; forming at least two holes adjacent to each other on the black matrix; forming at least one dam dividing the adjacent holes; and forming a spacer restricted within at least one of the at least two holes.

In another aspect of the present invention, a fabricating method of a liquid crystal display panel includes providing a first substrate; forming a black matrix on the first substrate that divides pixel areas in a boundary between the pixel areas; forming red, green, and blue color filters in the divided pixel areas; forming at least two holes adjacent to each other on the black matrix; forming at least one dam dividing the adjacent holes; forming a storage capacitor; and forming a spacer restricted within at least one of the at least two holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to an embodiment of the present invention, example of which is illustrated in the accompanying drawings.

With reference to FIGS. 4 to 8, embodiments of the present invention will be explained as follows.

Figure 4:
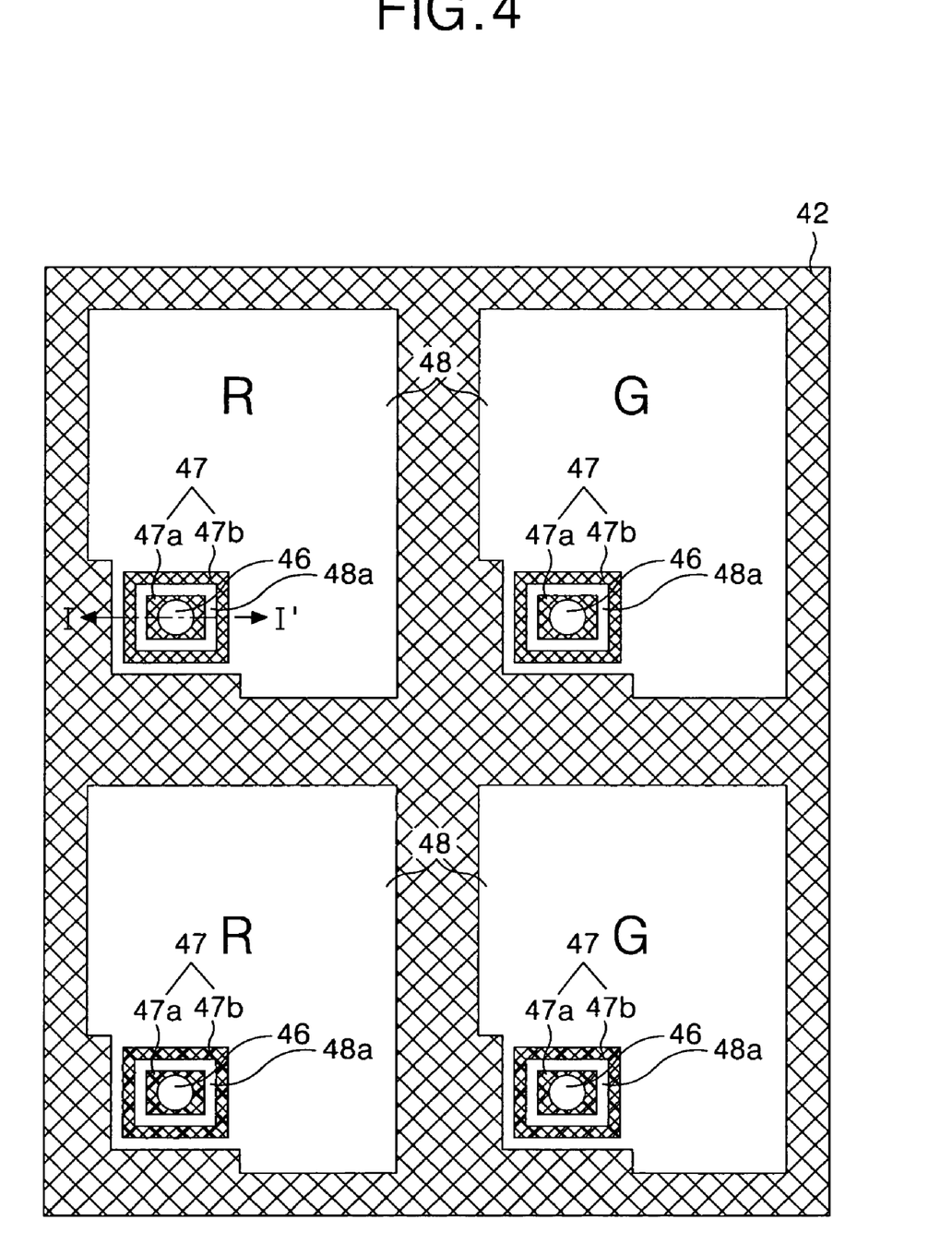
FIG. 4 is a diagram representing a part of an upper plate of a liquid crystal display panel according to an embodiment of the present invention.
Figure 5:
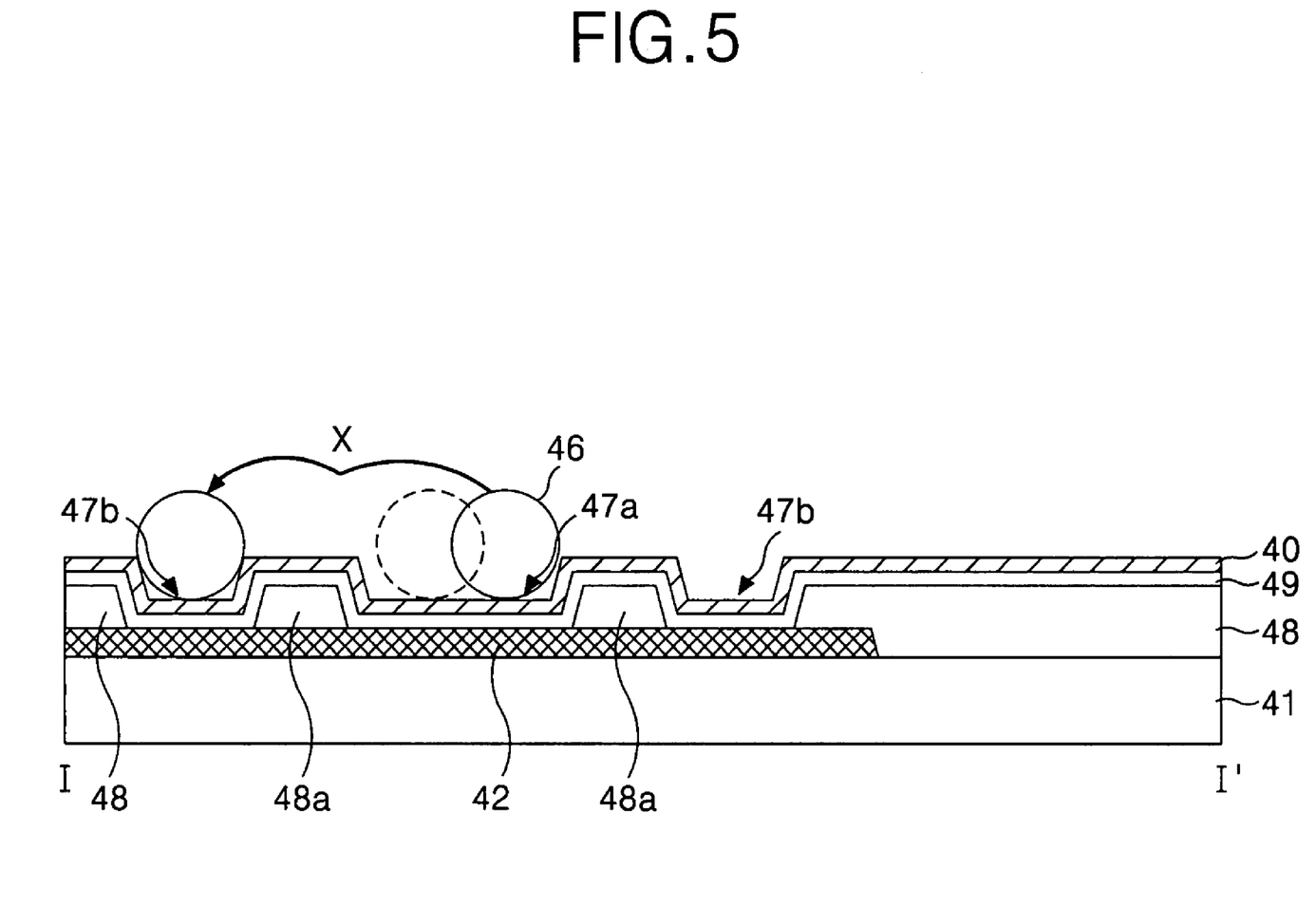
FIG. 5 is a diagram representing a cross section taken along the line I-I' shown in FIG. 4.

FIGS. 4 and 5 are diagrams representing a part of an upper plate of a liquid crystal display (LCD) panel according to an embodiment of the present invention.

Referring to FIGS. 4 and 5, the upper plate of the LCD panel may include a black matrix 42 formed to divide pixel areas on a first substrate 41. The upper plate may also include red, green and blue color filters 48 formed at each of the divided pixel areas. The color filters 48 include holes 47. The holes 47 include a first hole 47a and a second hole 47b that may be divided by a color filter dam 48a for minimizing the movement of a ball spacer 46.

The first and second holes 47a, 47b and the color filter dam 48a are formed to face a thin film transistor device part of a lower plate (not shown) that faces the upper plate.

The first and second holes 47a, 47b are formed to expose the color filter 48 to the black matrix 42, and are divided by the color filter dam 48a.

The upper plate of the LCD panel may also include a common electrode 49, an alignment film 40 and the ball spacer 46 at the first hole 47a formed on a first substrate 41, where the first and second holes 47a, 47b and the color filter dam 48a are formed.

The black matrix 42 may be formed of an opaque metal such as chrome (Cr) or chrome alloy or a black resin in a non-display area, and is formed to face the gate line and the data line of the lower plate (not shown). The black matrix 42 prevents light leakage and absorbs an external light, thereby acting to increase a contrast ratio.

The color filters 48 only transmit light from a light source (not shown) that corresponds to specific wavelengths for red, green and blue colors. In FIGS. 4 and 5, only parts of the color filters 48 are shown, but the LCD panel according to the present invention may include the tri-colored color filters 48 that include red, green and blue color filters arranged in a matrix.

A common voltage Vcom is supplied to the common electrode 49 and the common electrode 49 generates a voltage difference with a pixel voltage supplied to the pixel electrode of the lower plate (not shown) to drive the liquid crystal. The alignment film 40 is formed on the upper part of the common electrode 49 for aligning liquid crystal.

The color filter dam 48a reduces a phenomenon that occurs when the ball spacer 46 formed in the first hole 47a moves to the display area by pressure, oscillation, impact, etc. applied thereto after the process of forming the ball spacer 46. Further, as shown in FIG. 5, even though the ball spacer 46 formed in the first hole 47a moves along an arrow mark X under the influence of the pressure, oscillation, impact, etc., the ball spacer 46 is restricted to the second hole 47b by the color filters 48. Accordingly, the second hole 47b can further reduce the possibility that the ball spacer 46 invades the display area. Thus, it is possible to improve the cell gap uniformity and the contrast ratio of the LCD panel.

The present invention can form two or more holes 47 by forming one or more color filter dams 48a.

Figure 6A:
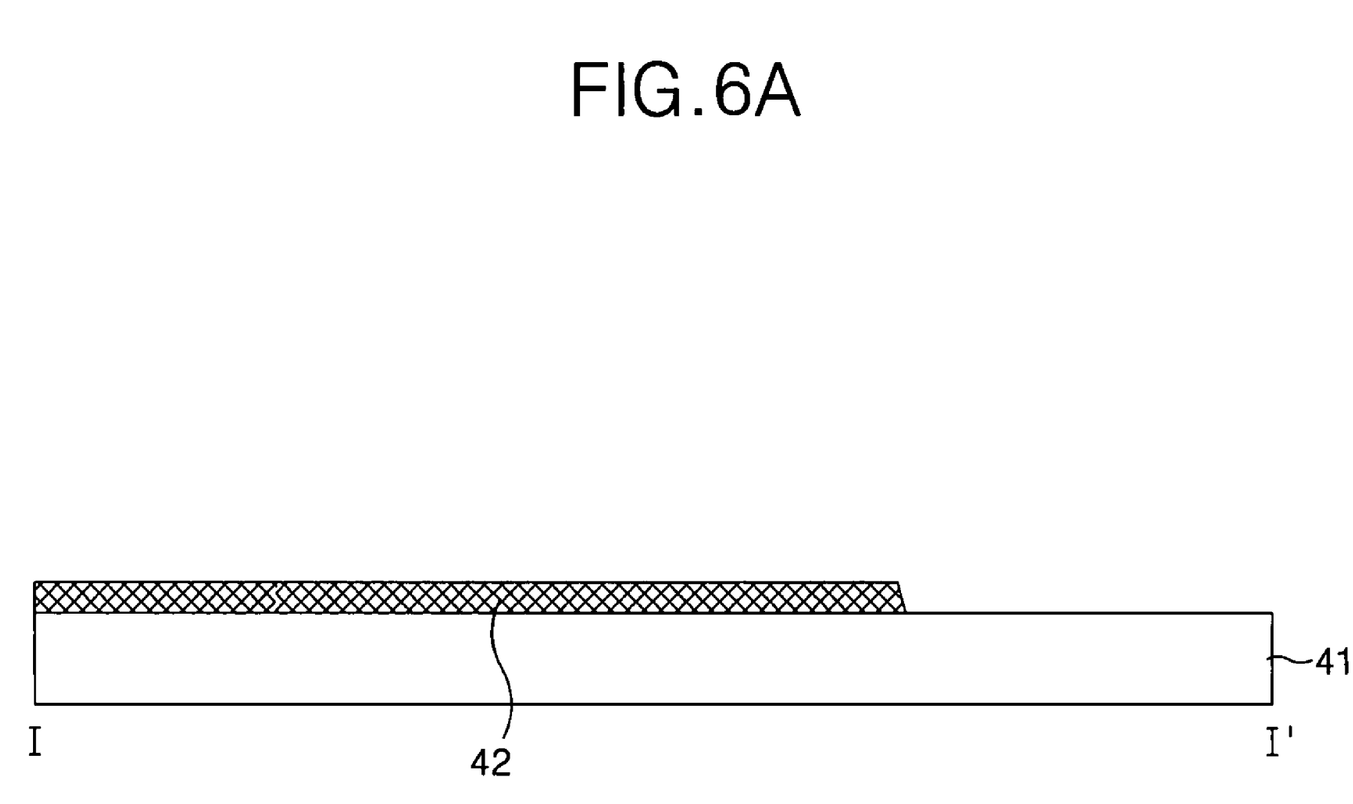
FIGS. 6A, 6B and 6C are diagrams representing a fabricating method of the upper plate of the liquid crystal display panel shown in FIGS. 4 and 5.
Figure 6B:
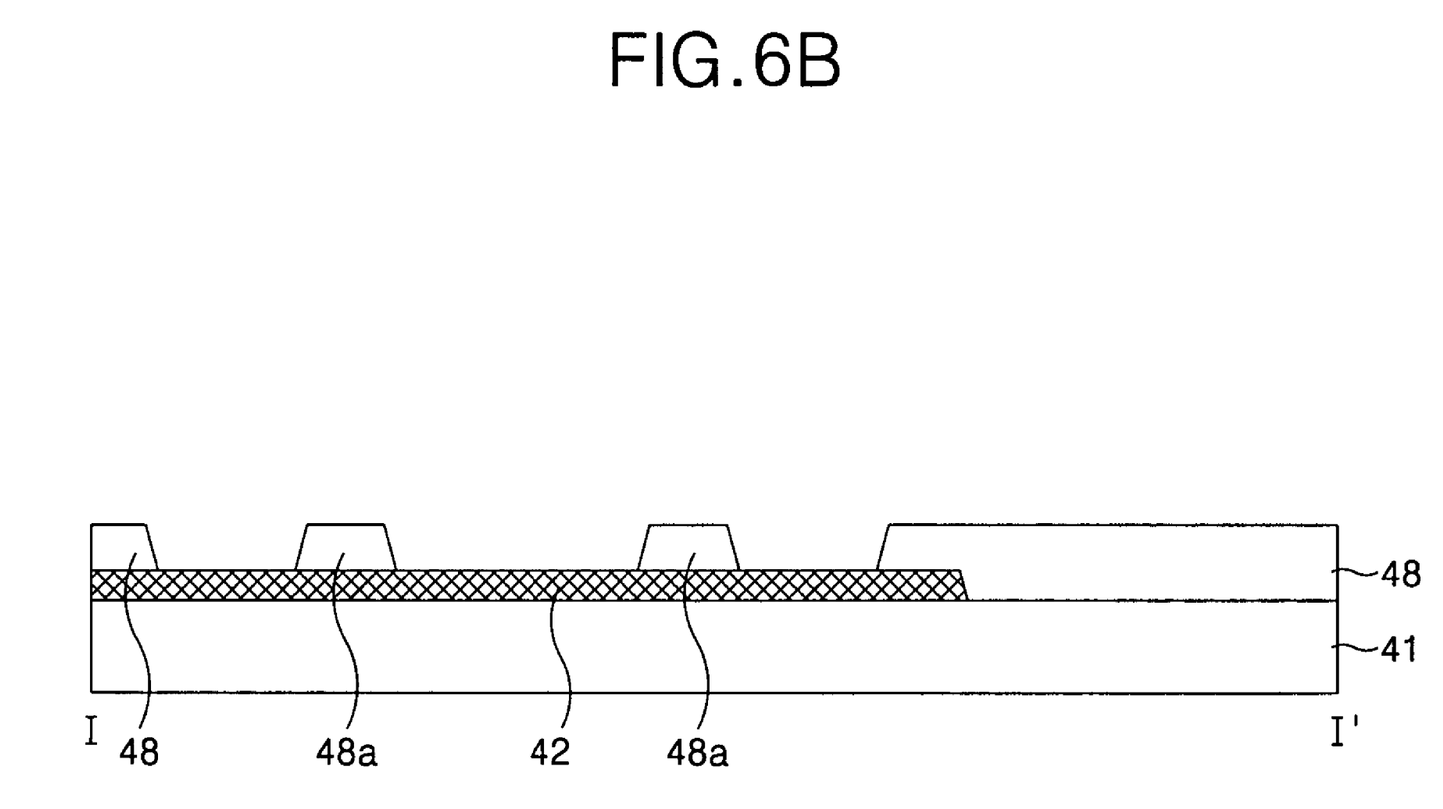
Figure 6C:
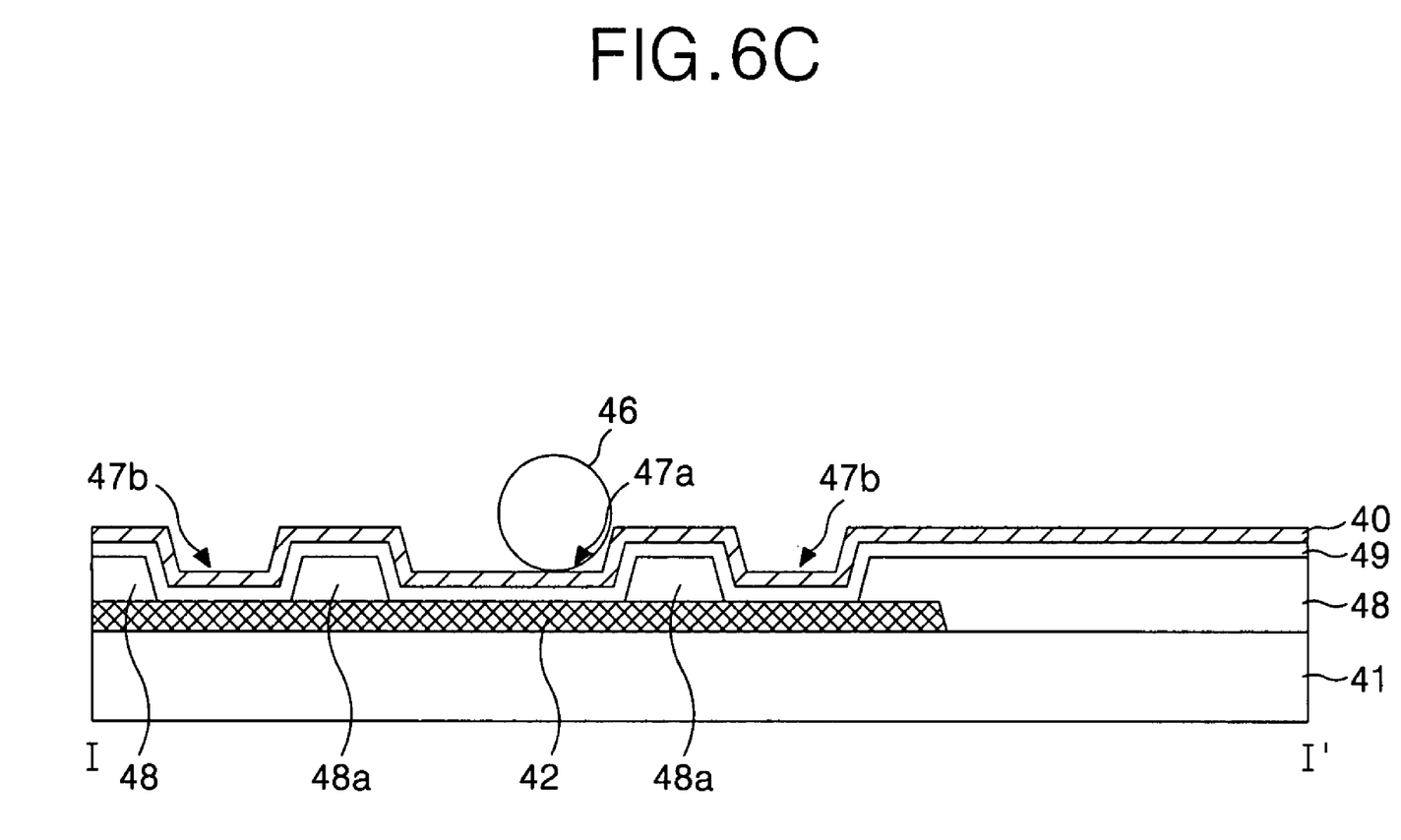

FIGS. 6A to 6C are diagrams illustrating a fabricating method of an upper plate shown in FIGS. 4 and 5.

Referring to FIG. 6A, a black matrix 42 is formed on the first substrate 41. The black matrix 42 may be formed by patterning an opaque metal, such as chrome (Cr) or chrome alloy, or a black resin by photolithography after coating the opaque metal or the black resin on the entire surface of the first substrate 41.

Then, as shown in FIG. 6B, the color filters 48 may be formed on the first substrate 41 where the black matrix 42 is formed. At the same time, the first and second holes 47a, 47b and the color filter dam 48a may be formed.

Though only a part of the upper plate is illustrated in the diagram, the color filter of the first substrate generally has a tricolor of red (R), green (G), blue (B). A red color filter area, a green color filter area and a blue color filter area are patterned by photolithography, thereby enabling the formation of the first and second holes 47a, 47b in each of the color filter areas.

Subsequently, as shown in FIG. 6C, the common electrode 49 and the alignment film 40 are formed, and the ball spacer 46 is formed in the first hole 47a which may be a central hole. In order to form the ball spacer 46, an ink-jet is aligned on the first hole 47a, and then the spacer ball held in the ink-jet is sprayed through a nozzle.

The ball spacer held in the ink-jet may be sprayed in a mixture including solvent. Thus, the ball spacer has better elasticity and hardness than the ball spacer of the related art. The ball spacer also has a fixed shape.

The upper plate shown in FIGS. 4 to 6C is bonded with a lower plate (not shown) to face the lower plate which includes a plurality of data lines, a plurality of gate lines, a plurality of thin film transistors disposed at each of the crossing parts of the data lines and the gate lines, and a pixel electrode at each of the pixel areas.

Then, liquid crystal is injected into a space provided by the ball spacer 46 between the upper plate and the lower plate.

The LCD device having the upper plate shown in FIGS. 4 to 6C may be applied to a TN mode LCD panel where a vertical direction electric field is applied according to the direction of the electric field which drives the liquid crystal.

In an IPS mode LCD panel, the common electrode is not formed on the upper plate. In an IPS mode LCD panel, a horizontal electric field is applied to secure a wide viewing angle. The IPS mode LCD panel includes a lower plate, which includes a plurality of data lines, a plurality of gate lines, a plurality of thin film transistors arranged in each of the crossing parts of the data lines and the gate lines, a pixel electrode and a common electrode for applying a horizontal electric field to each of the pixel areas, and a storage capacitor where the pixel electrode overlaps the common electrode.

Figure 7:
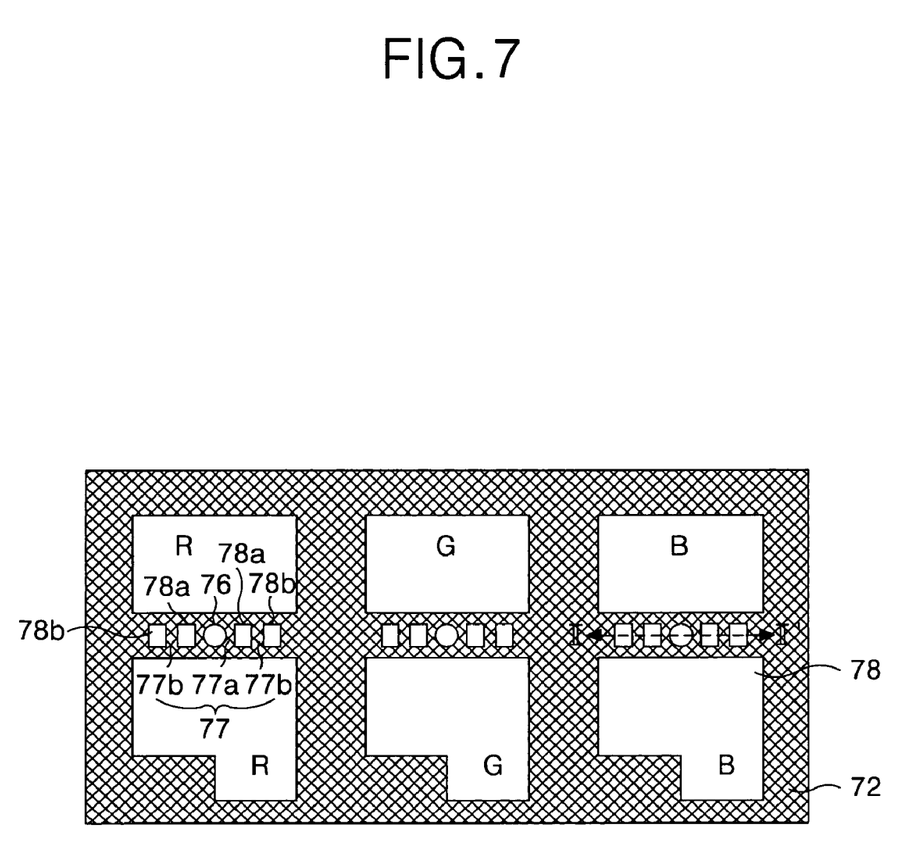
FIG. 7 is a diagram representing a part of an upper plate of a liquid crystal display panel according to another embodiment of the present invention.
Figure 8:
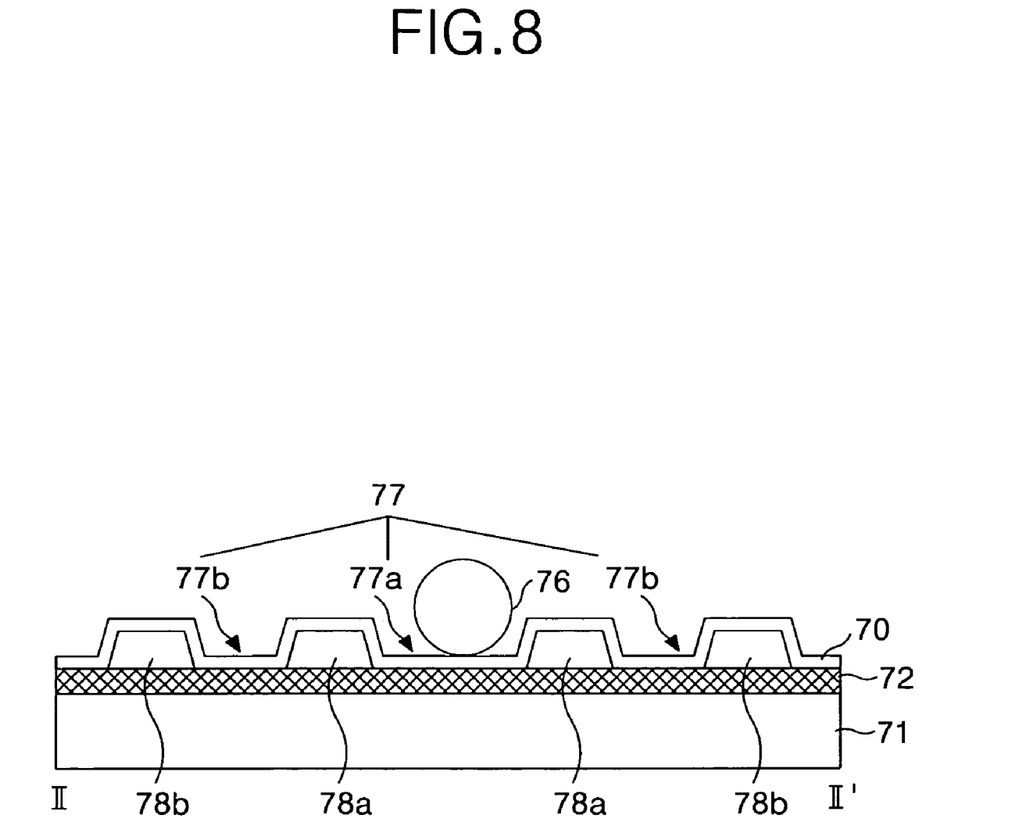
FIG. 8 is a diagram representing a cross section taken along the line II-II' shown in FIG. 7.

FIGS. 7 and 8 are diagrams showing a part of an upper plate of a LCD panel according to another embodiment of the present invention.

Referring to FIGS. 7 and 8, the upper plate according to the another embodiment of the present invention may include a black matrix 72 formed in a boundary between pixel areas on a first substrate for dividing the pixel area; red (R), green (G) and blue (B) color filters 78 formed on an upper substrate 71; first and second holes 77a, 77b adjacent to each other, and color filter dams 78a, 78b for dividing the first and second holes 77a, 77b on the black matrix 72; and a ball spacer 76 formed in the first hole 77a which may be a central hole.

The upper plate of the LCD panel according to the another embodiment of the present invention shown in FIGS. 7 and 8 is bonded with the lower plate of the foregoing IPS mode LCD panel. The first and second holes 77a, 77b and the color filter dam 78a, 78b are formed to face the storage capacitor of the lower plate.

Further, the LCD device according to the another embodiment of the present invention may include the alignment film 70 for aligning liquid crystal.

The black matrix 72 may be formed of the opaque metal, such as chrome (Cr) or chrome alloy, or the black resin in the non-display area, and is formed to face gate line and data line areas of the lower plate (not shown) and an area where a storage electrode is formed. The black matrix 72 prevents light leakage and absorbs an external light, thereby acting to increase contrast.

The LCD panel according to the another embodiment of the present invention may form two or more holes 77 by forming one or more color filter dams 78a, 78b.

In the another embodiment of the present invention, it is possible to minimize a phenomenon that occurs when the ball spacer 76 moves to the display area because the second hole 77b is formed even though the ball spacer 76 formed in the first hole 77a moves from the first hole 77a.

The fabricating method of such an upper plate is the same as the foregoing description in FIGS. 6A to 6C except for forming the common electrode 49, thus the description thereof will be omitted.

The present invention includes an LCD panel with at least two or more holes that use the color filter dam in the non-display area of the color filter substrate. The present invention also forms the ball spacer in the hole which is located in the middle among the holes. Accordingly, the present invention may minimize the phenomenon that occurs when the ball spacer moves to the display area by restricting the ball spacer to another hole which is formed at the outer area of the central hole even though the ball spacer moves by the pressure, oscillation, impact, etc. applied thereto after the process of forming the ball spacer. The present invention may improve the uniformity of the cell gap and the contrast ratio by restricting the undesired movement of the ball spacer to at least one hole.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
a black matrix formed on a first substrate and formed in a boundary between pixel areas for dividing the pixel areas;
red, green, and blue color filters formed at the divided pixel areas;
at least two holes adjacent to each other on the black matrix, wherein one hole is central to the other;
at least one dam, wherein the dam divides the adjacent holes and extends between both holes; and
a spacer restricted within at least one of the at least two holes,
wherein the spacer is restricted to the central hole among two or more holes,
wherein a common electrode is formed on the first substrate and overlaps with a pixel electrode formed on a second substrate to form a storage capacitor, and the at least two holes and the at least one dam are formed on the black matrix that faces an area where the storage capacitor is formed,
wherein the spacer is formed by spraying a spacer ball and a solvent held in ink-jet,
wherein the dam is formed from a single layer,
wherein the dam is formed entirely on the black matrix.

2. The liquid crystal display panel according to claim 1, further comprising:
a second substrate that faces the first substrate, wherein a liquid crystal layer is formed therebetween.

3. The liquid crystal display panel according to claim 2, wherein a plurality of data lines, a plurality of gate lines, a plurality of thin film transistors respectively disposed at crossing parts of the data lines and the gate lines, and a plurality of pixel electrodes respectively disposed at the pixel areas are formed on the second substrate.

4. The liquid crystal display panel according to claim 3, wherein the at least two holes and the at least one dam are formed on the black matrix that faces an area where the plurality of thin film transistors is formed.

5. A fabricating method of a liquid crystal display panel, comprising:
providing a first substrate;
forming a black matrix on the first substrate that divides pixel areas in a boundary between the pixel areas;
forming red, green, and blue color filters in the divided pixel areas;
forming at least two holes adjacent to each other on the black matrix, wherein one hole is central to the other;
forming at least one dam, wherein the dam divides the adjacent holes and extends between both holes; and
forming a spacer restricted within at least one of the at least two holes,
wherein the spacer is restricted to the central hole among the two or more holes,
wherein the spacer is formed by spraying a spacer ball and a solvent held in ink-jet,
wherein the dam is formed from a single layer,
wherein the dam is formed entirely on the black matrix.

6. The fabricating method according to claim 5, further comprising:
forming a common electrode which covers the red, green, and blue color filters and the black matrix.

7. The fabricating method according to claim 5, further comprising:
providing a second substrate that faces the first substrate; and
forming a plurality of data lines, a plurality of gate lines, a plurality of thin film transistors respectively disposed at crossing parts of the data lines and the gate lines, and pixel electrodes respectively disposed at the pixel areas on the second substrate.

8. The fabricating method according to claim 7, wherein forming a spacer restricted within at least one hole includes forming a liquid crystal layer between the first substrate and the second substrate and injecting the spacer for keeping a cell gap of the liquid crystal layer into the at least one of the at least two holes.

9. The fabricating method according to claim 7, wherein the at least two holes and the at least one dam are formed on the black matrix that faces an area where the plurality of thin film transistors is formed.

* * * * *